No. 798,484. PATENTED AUG. 29, 1905.
J. T. ARMSTRONG & A. ORLING.
METHOD OF ACTUATING ELECTROCAPILLARY APPARATUS.
APPLICATION FILED FEB. 2, 1904.

4 SHEETS—SHEET 1.

WITNESSES:
James C. Babcock
H. B. Williams

INVENTORS:
James T. Armstrong
Axel Orling
by W. H. Babcock
Attorney.

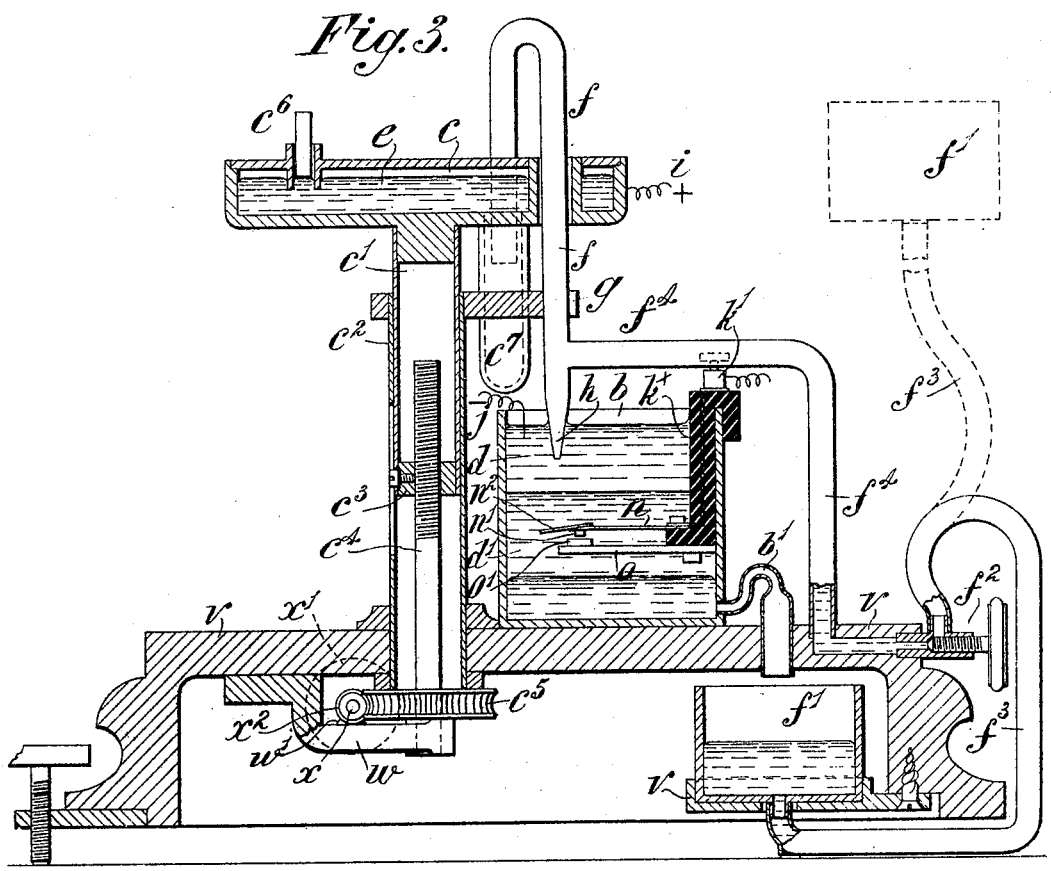

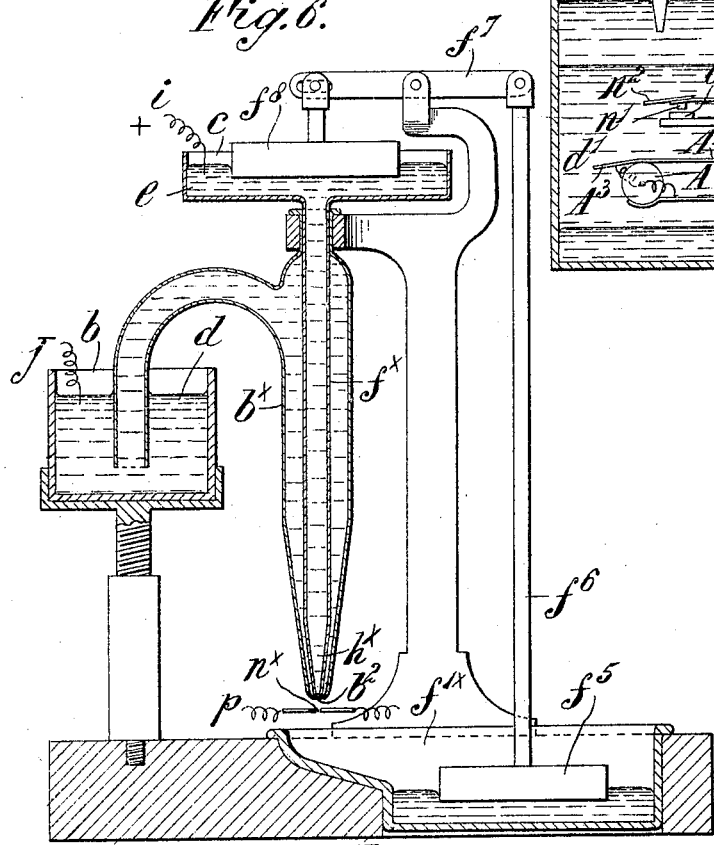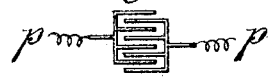

No. 798,484. PATENTED AUG. 29, 1905.
J. T. ARMSTRONG & A. ORLING.
METHOD OF ACTUATING ELECTROCAPILLARY APPARATUS.
APPLICATION FILED FEB. 2, 1904.

WITNESSES:
James C. Babcock
H. B. Williams

INVENTORS:
James T. Armstrong
Axel Orling
by Wm H Babcock
Attorney

UNITED STATES PATENT OFFICE.

JAMES TARBOTTON ARMSTRONG AND AXEL ORLING, OF LONDON, ENGLAND.

METHOD OF ACTUATING ELECTROCAPILLARY APPARATUS.

No. 798,484.        Specification of Letters Patent.        Patented Aug. 29, 1905.

Original application filed May 19, 1902, Serial No. 108,139. Divided and this application filed February 2, 1904. Serial No. 191,677.

*To all whom it may concern:*

Be it known that we, JAMES TARBOTTON ARMSTRONG, a subject of the King of England, and AXEL ORLING, a subject of the King of Sweden and Norway, both residing at London, England, have invented new and useful Improvements in Methods of Actuating Electrocapillary Apparatus, of which the following is a specification.

Our invention relates to methods employed for detecting the presence of electrical currents, and has for its object improvements whereby extremely weak currents may be detected and caused to actuate other apparatus or mechanisms directly or through one or more relays.

In carrying out our invention we make use of the electrocapillary force exerted at the surfaces in contact of certain dissimilar fluid conductors (such as mercury and dilute acid or a solution of spirits of wine and potassium iodid) when an electric current flows through one to the other. This force brings about a displacement of the said fluids, which effect we employ to start the action of a siphon or to disturb the balance of a delicately-poised part of the apparatus, by means of either of which or a combination of both a relay-circuit may be closed. In any case the normal condition of the apparatus is one of equipoise and the effect of the electrocapillary force is to disturb the equilibrium. It is therefore manifest that the displacement (which always accompanies the passage of even the weakest currents) must vary the distribution of weight and cause a preponderance on one side that will effectually operate the apparatus.

According to our invention the fluid conductors are in some cases contained by separate receptacles, which communicate with each other through a tube or other suitable channel, or, alternatively, we employ a tube or an equivalent part of suitable form alone, as is hereinafter particularly described with reference to the accompanying drawings, in which—

Figure 8:
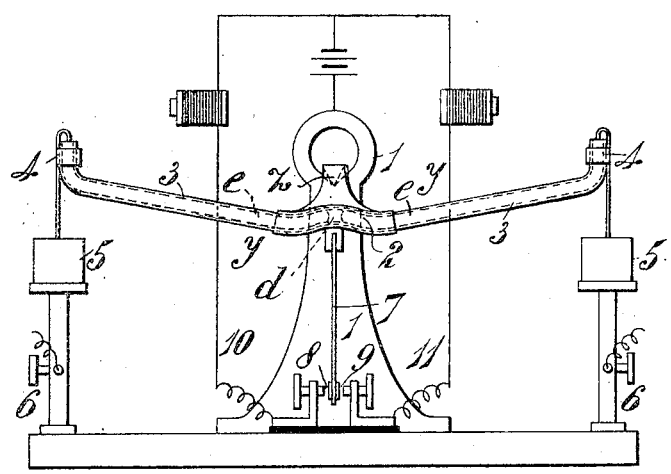
Figure 9:
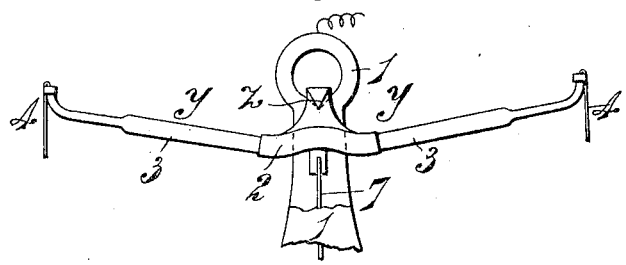

Figures 1, 2, 3, and 6 show diagrammatically various forms of our invention in vertical section. Fig. 4 is a detail, and Figs. 5 and 7 are modifications hereinafter referred to. Fig. 8 is a front elevation of a modified form of our invention, a part of the frame being shown broken away; and Fig. 9 is a similar view illustrating a further modification.

According to the simplest form of our invention (shown in Fig. 1) we employ a vessel $a$, having two chambers $b$ and $c$, the former of which is shallow and contains dilute acid $d$, while the latter is considerably deeper and contains mercury $e$, the surface of which is maintained at a considerably higher level than that of the dilute acid in $b$. Above the chambers $b$ $c$ is an inverted-U-shaped siphon $f$, which is filled with mercury and is supported by a bracket $g$, while its legs dip into the fluids contained by the chambers $b$ $c$. In order to prevent the mercury from normally flowing through the siphon in the absence of the electrocapillary force, the end of the delivery-leg $h$ is constricted. When, however, the current flows, it is at this precise point that the electrocapillary force is set up and displacement of the fluid in the direction from positive to negative takes place. In order, therefore, that this displacement may be in the same direction that the mercury flows through the siphon, the current enters the apparatus at $i$, where it enters the mercury passing through it in the siphon into the dilute acid in the chamber $b$, whence it leaves the apparatus at $j$. In this way the electrocapillary force acts to reduce the resistance which the constricted portion of the delivery-leg $h$ of the siphon $f$ opposes to the flow of the fluid in its absence.

Figure 1:
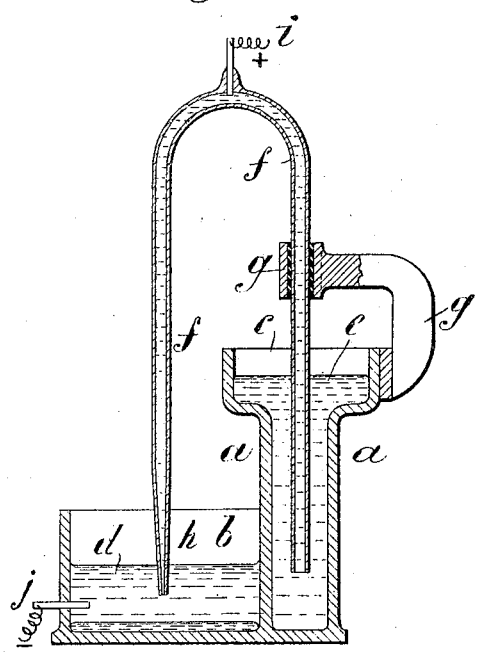
Figure 2:
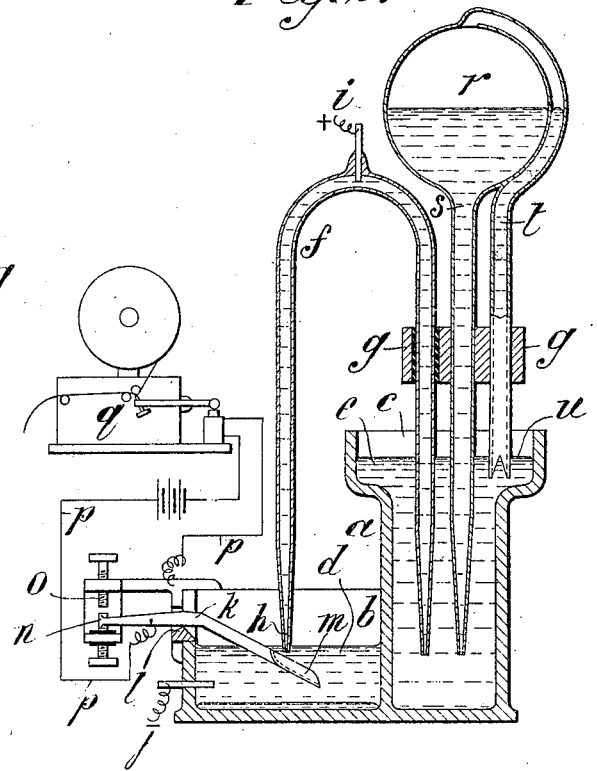

In Fig. 2 is shown another form of our invention, which is provided with a means of maintaining the level of the mercury in the chamber $c$ and is adapted to operate a relay. According to this arrangement a lever $k$ is delicately poised at a point $l$ adjacent to the delivery end of the siphon $h$, while one of its ends $m$ extends beneath the surface of the dilute acid in the chamber $b$ in order that any mercury delivered by the siphon $f$ may fall upon it, and so cause its other end $n$ to make contact at $o$, and thereby close a relay-circuit $p$, by means of which a telegraph instrument $q$, a call-bell, or any other apparatus or mechanism may be operated. Preferably the end $m$ of the lever $k$ is trough-shaped in order that the mercury delivered onto it may remain in contact therewith for an appreciable time. According to the construction shown in this figure both ends of the siphon are constricted for the same purpose as the one shown in Fig. 1. In order to preserve the level of the mercury $e$ in the chamber $c$, a reservoir $r$ is provided. This reservoir contains mercury and is provided with two tubular legs $s$ $t$, the former of which extends beneath the surface, where its lower extremity may be constricted to prevent a too rapid supply of mercury, while the other leg $t$ is shorter and terminates with an oblique or V-shaped aperture $u$ in order that it may be gradually opened as the level of the mercury in the chamber $c$ falls. The mercury in the reservoir $r$ is retained by a partial vacuum, that is gradually destroyed by the admission of air through the leg $t$ as the level of the mercury in the chamber $c$ falls, and it is on account of this that sufficient mercury is allowed to leave the reservoir to maintain the level, and so close the vent.

In Fig. 3 is shown a modified construction according to which the chamber $c$ is supported by a stem $c'$, adapted to slide in a tubular post $c^2$ in order that the level of the mercury $e$ contained by it may be adjusted relatively to the siphon, which is held stationary by its holder $g$, secured to the tubular post $c^2$. The stem $c'$ is provided at its lower extremity with a nut $c^3$, which is engaged by a screw-threaded rod $c^4$, located within the tubular post $c^2$. The lower end of the screw-threaded rod $c^4$ passes through the base $v$ of the apparatus, where it is provided with a worm-wheel $c^5$ and is journaled in a bracket $w$. This bracket is provided with a lug $w'$, in which is journaled a shaft $x$, that extends through the base of the outside, where it has a milled head $x'$. At its inner end this shaft is provided with a worm $x^2$, which engages the wheel $c^5$, through which the rod $c^4$ may be rotated and the chamber $c$ raised or lowered. The chamber $c$ is provided with a float $c^6$ to indicate the level of the mercury, and a deep pocket $c^7$, into which the short leg of the siphon $f$ dips. The chamber $b$ is provided with a heavy non-conducting fluid $d'$, such as carbolic acid, above which floats a lighter conducting fluid $d$, such as a solution of spirits of wine and potassium iodid, into which dips the constricted end $h$ of the long leg of the siphon $f$. Beneath this siphon and immersed in the non-conducting fluid $d'$ are located the relay-contacts $n$ and $o$, which extend from a piece of insulating material $k^\times$, removably attached to one of the walls of the chamber $b$. This part $k^\times$ is provided with binding-posts $k'$ and has holes through which connections extend to the contacts $n$ and $o$, respectively. The contact $n$ is preferably composed of a strip of platinum provided with a hammer $n'$ of the same material, which is adapted to make contact with a carbon anvil $o'$, supported by the other terminal $o$. At the end of the contact $n$ an inclined plate $n^2$, of mica or other suitable material, is located, upon which the mercury delivered by the siphon falls, and thereby closes the relay-circuit, whereafter the mercury rolls off and sinks to the bottom of the chamber, whence it flows through the overflow-pipe $b'$ to a cup $f'$, supported upon a pivoted shelf $v'$ beneath the base $v$. From this cup the mercury may be returned to the chamber $c$ by raising the cup, as shown by dotted lines, and opening the valve $f^2$, when the mercury will flow through the flexible tube $f^3$, valve $f^2$, tube $f^4$, to the siphon $f$, whence most of it will pass upward and into the said chamber $c$.

In Fig. 5 is shown a modification of the arrangement last described, according to which the apparatus is adapted for use with a coherer-circuit of any well-known kind. The coherer A is located in the non-conducting fluid $d'$ between spring-fingers $A'$ and $A^2$, to which its terminals are respectively connected. The upper of these fingers $A'$ is provided with a downwardly-inclined portion $A^3$, upon which the mercury that is delivered by the siphon $f$ falls after it leaves the plate $n^2$ of the relay-closing device. In this way the coherer is vibrated and decoherence effected without the employment of an electromagnet, whereby local disturbances are obviated. In this arrangement one of the fingers is connected to an aerial conductor B and the other is led to earth E, while the relay and its battery are contained in a circuit C, which is completed through the coherer. In this circuit the positive pole of the battery is connected with the mercury in the siphon, through which it flows to the other fluid-conductor $d$, whence the current flows through the conductor C to complete the circuit.

In Fig. 6 is shown an arrangement in which the siphon $f$ is dispensed with, and the chamber $c$, containing mercury $e$, is provided with a tubular leg $f^\times$, which is constricted at its end $h^\times$, so as to normally resist the flow of mercury from the said chamber. The leg $f^\times$ dips into the funnel-shaped leg of a siphon $b^\times$, whose lower extremity is closed but for a central perforation $b^2$. The short leg of the siphon $b^\times$ dips into the chamber $b$, that contains dilute acid $d$, from which the long leg is kept supplied, while its escape through the annular space between its lower extremity and that of the leg $f^\times$ is prevented by the surface tension of the dilute acid. Sufficient of the dilute acid, however, is drawn by capillary attraction into the constricted end $h^\times$ of the leg $f^\times$, through which electric connection with the mercury is established. Upon the passage of a current from mercury to dilute acid displacement takes place in the same direction, resulting in a flow of the mercury from the leg $f^\times$, which thereafter falls through the perforation $b^2$, which may be slightly larger than the constricted end of the said leg $f^\times$. This mercury during its further descent is caused to bridge a "break" $n^\times$ in the relay circuit $p$, and so close it. Instead of the terminals of the relay-circuit being arranged as shown in Fig. 6 they may be interleaved, as shown in Fig. 7. The mercury that is thus delivered falls into a reservoir $f'^{\times}$, in which is located a float $f^5$, provided with an upwardly-extending member $f^6$, that is pivoted to a suitably-fulcrumed lever $f^7$, to whose opposite extremity is connected a displacer $f^8$, located in chamber $c$. As the mercury flows into the reservoir $f'^{\times}$ the float $f^5$ is raised and the displacer $f^8$ is lowered, so that the level of the mercury $e$ in the chamber $c$ is maintained.

In Fig. 8 is shown another construction, according to which a scale-beam $y$ is delicately poised on a knife-edge $z$ in suitable standards I, one of which is shown broken off in the drawing in order to show more clearly what is behind. The scale-beam $y$ consists of a tube of non-conducting material, which rests in a suitable cradle 2 and is provided with two upwardly-inclined limbs 3, arranged symmetrically on either side of the knife-edge $z$. These limbs 3 may be reduced in diameter toward their ends, (see Fig. 9,) where they are left open and are upturned. This tube, which is of the shape shown in the drawing, contains a small quantity of dilute acid $d$ at its center, while equal quantities of mercury $e$ are provided on each side of that point, which are kept separate by the said drop of dilute acid $d$. To the ends of the scale-beam are secured conductors 4, which maintain electrical connection between the mercury $e$ in the limbs 3 and the mercury in the cups 5, into which the said conductors 4 dip. These mercury-cups are provided with suitable terminal connections 6, by way of which an electric current may enter the apparatus and after trasversing the fluid-conductors in the tube of the scale-beam $y$ leave it. When a current is passed through the apparatus, the electrocapillary force exerted at the surfaces in contact of the dissimilar-fluid conductors causes them to be displaced in the direction from positive to negative, thereby disturbing the balance and causing the beam to turn in a direction controlled by that of the current. By reducing the diameter of the limbs 3 of the scale-beam tube toward their ends, as shown in Fig. 9, a slight displacement of the fluids at the center is magnified at the end, resulting in a more decided movement, owing to the increased leverage. The beam $y$ is provided with an insulated depending finger 7, which is located between the contacts 8 and 9 of two relay-circuits 10 11, one or other of which is closed by the said finger and one of the contacts when the balance is turned.

It is obvious that we may employ two or more siphons or the equivalent capillary element in order that a larger quantity of mercury may be delivered or displaced when a current passes through the apparatus.

What we claim as our invention, and desire to secure by Letters Patent, is—

1. The method of actuating electrocapillary apparatus consisting in the following steps: firstly inclosing a fluid electric conductor within a capillary tube, secondly, keeping such tube supplied with said fluid electric conductor, thirdly, arranging a dissimilar-fluid electric conductor in contact with the first-named fluid at the discharge end of the said tube and finally applying an electric charge to the contacting surfaces of the two fluids, whereby the balance of opposed natural forces is disturbed, substantially as set forth.

2. The method of actuating electrocapillary apparatus consisting in the following steps: firstly inclosing a fluid electric conductor within a capillary tube, secondly keeping such tube supplied with said fluid electric conductor, thirdly, arranging a dissimilar-fluid electric conductor in contact with the first-named fluid at the discharge end of the said tube and finally applying an electric charge to the contacting surfaces of the two fluids whereby the balance between the forces of gravity and capillarity is disturbed, substantially as set forth.

3. The method of actuating electrocapillary apparatus consisting in the following steps: firstly, inclosing two dissimilar fluid electric conductors within a capillary tube; secondly, pivotally supporting said capillary tube and finally applying an electric charge to the contacting surfaces of the two fluids to produce a displacement of the said fluids whereby the equilibrium of the pivoted part is disturbed and so caused to move substantially as set forth.

4. The method of actuating electrocapillary apparatus consisting in the following steps: firstly, inclosing a fluid electric conductor within a capillary tube wherein it is normally held at rest by the balance of two natural forces, secondly, keeping such tube supplied with said fluid electric conductor, thirdly, arranging a dissimilar-fluid electric conductor in contact with the first-named fluid at the discharge end of the said tube and finally applying an electric charge to the contacting surfaces of the two fluids whereby the balance of the opposed natural forces is disturbed and one of the said fluids caused to flow, substantially as set forth.

5. The method of actuating electrocapillary apparatus consisting in the following steps, firstly: inclosing a fluid electric conductor within a capillary tube wherein it is normally held at rest by the balance of gravity and capillarity, secondly, keeping such tube supplied with said fluid electric conductor, thirdly, arranging a dissimilar-fluid electric conductor in contact with the first-named fluid at the discharge end of the said tube, and finally applying an electric charge to the contacting surfaces of the two fluids whereby the balance between the said forces of gravity and capillarity is disturbed and one of the said fluids caused to flow, substantially as set forth.

6. The method of actuating electrocapillary apparatus consisting in the following steps: firstly, inclosing a fluid electric conductor within a capillary tube wherein it is normally held at rest by the balance of gravity and capillarity, secondly, keeping such tube supplied with said fluid electric conductor, thirdly, arranging a dissimilar-fluid electric conductor in contact with the first-named fluid at the discharge end of the said tube and finally applying an electric charge to the contacting surfaces of the two fluids whereby the capillary force is reduced and one of the said fluids caused to flow, substantially as set forth.

7. The method of actuating electrocapillary apparatus consisting in the following steps: firstly inclosing a column of an electric conducting fluid within a capillary tube wherein it is normally held at rest by the balance of gravity and capillarity, secondly, maintaining the height of such column of electric conducting fluid, thirdly, arranging a dissimilar-fluid electric conductor in contact with the first-named fluid at the discharge end of the said tube and finally applying an electric charge to the contacting surfaces of the two fluids whereby the capillary force is reduced and one of the said fluids permitted to flow, substantially as set forth.

In testimony whereof we have signed our names to this specification in the presence of two subscribing witnesses.

JAMES TARBOTTON ARMSTRONG.
AXEL ORLING.

Witnesses:
W. H. WOOD,
E. A. GODDIN.